3,405,192
PROCESS FOR OBTAINING PURE ACETYLENE
August Kruis, Pullach, Isartal, Walter Scholz, Wolfratshausen, and Gerhard Ranke, Pocking, Germany, assignors to Gesellschaft für Linde's Eismaschinen Aktiengesellschaft, Wiesbaden, Germany
Filed Jan. 27, 1965, Ser. No. 428,439
Claims priority, application Germany, Feb. 1, 1964, G 39,753
18 Claims. (Cl. 260—679)

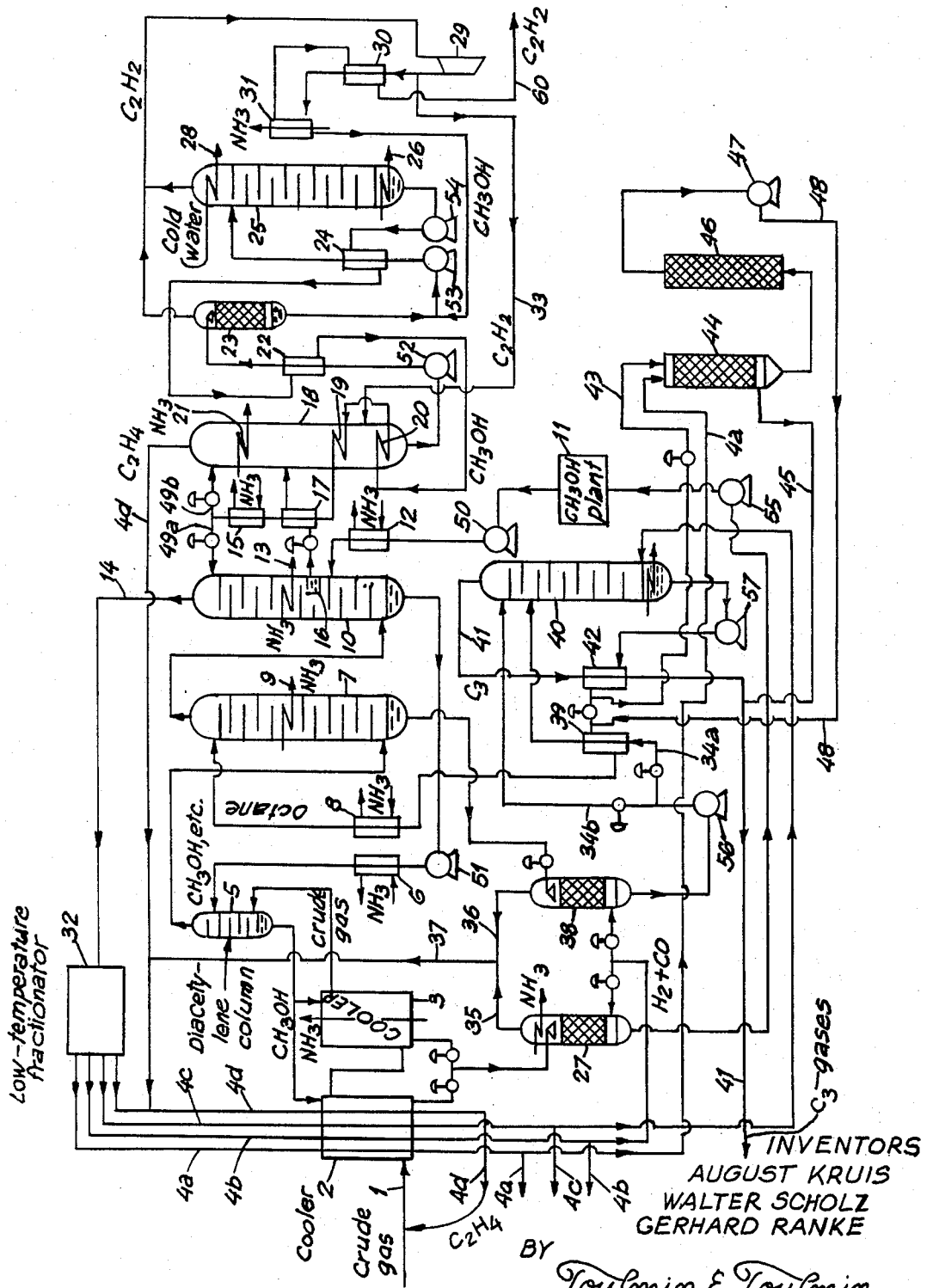

ABSTRACT OF THE DISCLOSURE

Recovery of acetylene from a gas containing diacetylene and $C_3$-hydrocarbons in addition, by first scrubbing the gas with methanol to remove diacetylene, second, scrubbing the resultant gas with octane to remove the $C_3$-hydrocarbons, and then thirdly, scrubbing the gas with methanol to dissolve the acetylene, the first step being conducted at sufficiently low temperatures and with sufficient methanol to selectively dissolve the diacetylene.

---

The present invention relates to the purification of acetylene. More particularly, it relates to the recovery of substantially pure acetylene from impure mixtures thereof obtained by thermal cracking of hydrocarbons in the presence or absence of oxygen, or by electrical cracking, by removal of carbon black followed by successive treatments with polar and nonpolar solvents maintained in closed circulation between absorption and regeneration.

Unsaturated hydrocarbons such as acetylene, ethylene and propylene are generally obtained by the cracking of gaseous hydrocarbons, such as methane, or its higher homologues such as ethane or propane, mixtures thereof, natural gas, refinery gases, liquid hydrocarbons such as gasolene, as higher boiling hydrocarbons or oils. The cracking may be effected over fairly wide ranges of temperature and pressure, the pressures usually used ranging from subatmospheric up to a few atmospheres, and the temperature from about 1200° C. up. Varying proportions of the unsaturated hydrocarbons are obtained depending upon the reaction conditions used, the ratio of acetylene to ethylene being controlled through rather wide limits by a suitable choice of operating conditions, and this variation of acetylene content thus requires some modification of procedure in the recovery of pure acetylene.

Unsaturated hydrocarbon mixtures obtained by the cracking of hydrocarbons usually contain $C_3$- and $C_4$-hydrocarbons such as propylene, cyclopropane, methyl-acetylene, propane and butane, as well as traces of higher acetylenes, such as methyl-acetylene, ethyl-acetylene, di- and tri-acetylenes, mono- and divinyl-acetylene, and dienes such as propadiene, butadiene and cyclopentadiene. Because of the tendency of such unsaturated hydrocarbons to explode it is necessary that they be removed from gases intended for polymerization. In addition to the above, the mixtures also usually contain traces of benzene hydrocarbons and aromatics such as benzene, toluene, phenylacetylene and stilbene.

The separation of pure acetylene from mixtures containing such materials as the above involves numerous problems. No satisfactory method of purification by condensation and rectification has been found and hence acetylene has usually been recovered from these complex mixtures by physical washing procedures. Such processes have involved washing in several stages as well as the use of polar and nonpolar solvents or different solvents from stage to stage.

The necessary washing fluid circulation is given by Henry's law:

$$W = K \frac{G}{P \cdot \lambda}$$

where
$W$=washing medium circulation (t./h.)
$G$=amount of gas (Nm.$^3$/h.)
$P$=total gas pressure (atm.)
$\lambda$=solubility coefficient $$\frac{Nm.^3 \text{ (gas)}}{t(\text{washing fluid}) \cdot at \text{ (partial pressure of gas)}}$$

$K$=absorption factor

The required amount of washing fluid is, therefore, proportional to the amount of gas and is independent of the concentration of the component that is to be washed out when $\lambda$ is independent of the concentration.

The present invention is concerned with a technically dependable and satisfactory method of obtaining substantially pure acetylene in high yields from cracked hydrocarbon gases of the above composition, while at the same time keeping the losses of ethylene as low as possible. This desired object has been attained by the process of the present invention by treating the impure acetylene-containing gases with a sufficient amount of a polar washing fluid for the absorption of the diacetylene contained therein, and then removing the $C_3$-hydrocarbons with a nonpolar solvent, and finally absorbing acetylene in a polar washing fluid from which the acetylene can readily be separated.

Since at reduced temperatures the solubility of gases generally, and of the higher acetylenes is increased with relation to acetylene, the process of the present invention is advantageously carried out at temperatures ranging from —20° C. to —80° C., and preferably at —40° C., under increased pressures, and especially at between 13 and 15 atmospheres, where the maximum pressure is determined by the familiar Reppe safety curves.

In carrying out the process for the recovery of the acetylene, the impure acetylene-containing gas is preferably sprayed with a polar washing fluid during the first diacetylene washing stage while being precooled thereby, the polar washing fluid being taken from a column connected directly behind the precooler and serving as the principal means for washing out the diacetylene. In this manner, the crude gaseous mixture can be cooled simultaneously with the removal of the water, the aromatics and the $C_4$- and higher hydrocarbons.

The removal of the diacetylene by the above washing procedure is advantageously effected either under the same pressure at which the crude acetylene-containing mixture is produced, or at a pressure between the latter and that of the next absorption stages where the absorption of the C₃-hydrocarbons by a nonpolar solvent and the absorption of the acetylene by a polar solvent occurs under increased pressure of preferably 13 to 15 atmospheres, the washing temperature being again between —20° C. and —80° C. This procedure makes use of the technical discovery that the solubility coefficient of the diacetylene under Henry's law increases with a lowering of the partial pressure. This results first in a greater final purity of the gases leaving the diacetylene washing column and also makes it unnecessary to compress the crude gas until after the diacetylene and higher hydrocarbons have been removed therefrom and thus will protect the compressor against injury by these substances.

The operation of the process of the present invention at lower temperatures is especially advantageous when the acetylene-free gas is subjected to a low-temperature fractionation procedure for which it must first be cooled to a low temperature. If the acetylene-washing is not followed by a low-temperature fractionation, the operation can then be carried out with lower solubilities and smaller solubility differences and treat the gas at ordinary temperatures, or only slightly below the latter, and under the pressures at which the crude gas is produced.

The polar solvents suitable for use at low temperatures in the process of the present invention include acetone and methanol, which are not only advantageous but also economical. Polar solvents suitable for use at higher temperatures include dimethylformamide, methyl ethyl ketone, butyrolactone, acetonylacetone, N-methyl-pyrrolidone, acetaldehyde, diethyl ketone, cyclohexanone, etc.

Nonpolar solvents suitable for use in the process include gasolene fractions having a boiling range preferably in the range of 70° to 150° C., consisting mainly of octane; other gasolene fractions of similar boiling point ranges, with heptane or nonane as their principal components; aromatic hydrocarbons containing similar numbers of carbon atoms, such as xylene, or ethyl benzene, etc. The nonpolar solvent selected serves the purpose of washing out the C₃-hydrocarbons methylacetylene, propadiene, propylene, cyclopropane and propane in a single stage selectively ahead of the C₂-hydrocarbons acetylene, ethylene and ethane. This makes possible a separation according to the number of carbon atoms in the molecule, regardless of their degree of saturation. Because of their tendency to absorb unsaturated compounds in preference to saturated compounds, polar washing fluids are not suitable for such purposes. In selecting a nonpolar washing fluid, consideration should be given not only to its vapor pressure and solidifying point but also to the fact that with reduction in the number of carbon atoms in the solvent molecule the solvent power generally increases while the selectivity for C₃-hydrocarbons, as compared to C₂-hydrocarbons, diminishes.

During the treatment of impure acetylene-containing gases with solvents special difficulties are encountered in the regeneration of the solvents used. The main portion of the higher-boiling, readily polymerizable impurities, as has been previously noted, is absorbed in the polar washing fluid during the first washing stage. By expansion, stripping and warming alone the pure solvent can be recovered only with difficulty, first because of the presence in such solvent of higher boiling components, and second because of the spontaneous decomposition and uncontrollable polymerization of the higher acetylenes and polyenes difficulties often result. The polar solvent from the first washing stage, containing water, benzene hydrocarbons and aromatics, all higher acetylenes and dienes, diacetylenes, and a portion of the monovinylacetylene, is preferably regenerated by being expanded and treated in a first stripping zone with sufficient stripping gas for recovery of the dissolved acetylene, and in a second stripping zone in the presence of water by a substantially increased amount of stripping gas at a temperature below the boiling point of the polar solvent. The addition of water results in a separation into two phases, a heavier phase consisting of a mixture of water and solvent, and a lighter phase which contains the washed out hydrocarbons. The volatility of these hydrocarbons is considerably increased thereby. The solvent is then recovered by distillation from the water-solvent mixture remaining atfer the stripping operation.

The solvent from the diacetylene washing stage can also be regenerated by converting the higher acetylenes into nonpolymerizable compounds by catalytic hydrogenation while in solution. This method, however, is somewhat less desirable because in the process of the present invention the heavier unsaturated hydrocarbons are present in very high concentration and hence make hydrogenation somewhat difficult.

During the regeneration of the nonpolar solvent used in the second washing stage for the absorption of the saturated and unsaturated C₃-hydrocarbons, and the residual monovalent acetylene, care must be exercised to prevent the accumulation of any traces of diacetylene, higher acetylenes and dienes which may have escaped from the first washing stage. Since the tendency to polymerize is greater in nonpolar than in polar washing fluids, the regeneration is preferably performed at moderate temperatures. Furthermore, the components which are less volatile than the solvent cannot be removed by heat alone. Since, however, the higher acetylenes and polyenes are present in smaller amounts than in the diacetylene washing stage, the catalytic hydrogenation process is in this case generally more desirable for completing the regeneration. An especially satisfactory method of supplementing the process of the present invention consists in catalytically hydrogenating, while in solution, the higher acetylenes and polyenes which have been absorbed by the nonpolar washing fluid.

The catalytic hydrogenation is preferably effected after the regeneration of the nonpolar solvent by expansion, stripping and warming, that is, after the nonpolar solvent from the C₃-washing step is expanded, stripped in a first stripping zone with a sufficient amount of auxiliary gas for the recovery of the dissolved acetylene and ethylene, and in a second stripping zone freed from gas at temperatures between 60 and 80° C. at which there is little, if any, danger of polymerization by the auxiliary gas and/or under diminished pressure, and then subjected to at least a partial catalytic hydrogenation of the higher acetylenes and polyenes contained therein. Because of the low concentration of these undesired hydrocarbons a small portion of the solvent to be subjected to a hydrogenation can be continuously drawn off and then returned to the main portion.

In order to prevent as far as possible the formation of higher boiling no longer polymerizable hydrocarbons, the so-called "green-oil," the hydrogenation temperature is maintained as low as possible, preferably between 0 and 30° C. The hydrogen used for the hydrogenation may be any available pure hydrogen, which does not contain more than 10 p.p.m. of carbon monoxide. If hydrogen or an ammonia synthesis mixture is obtained from the cracked gas by means of a liquid nitrogen scrubbing subsequent to the acetylene removal, then the head product of the nitrogen wash column, containing about 90% hydrogen with the remainder nitrogen and less than 5 p.p.m. of carobn monoxide, can be used as the hydrogenation agent, the amount required being about 10 to 20% in excess of the stoichiometric amount.

The hydrogenation can be carried out under the pressure at which the hydrogen is produced. If the hydrogen is taken from the associated low-temperature fractionating instillation, then the hydrogenation is carried out under a pressure slightly below the fractionation pressure.

As previously noted, during the hydrogenation there is formed a small amount of "green oil" which does not readily polymerize further, but which because of its high boiling point cannot be separated from the solvent by distillation. In order to prevent it from accumulating, it can be removed from the bottom of the rectification column as a sump product. It is especially advantageous to free the hydrogenation solution from the "green oil" by treatment with an adsorbing agent such as activated carbon. Since the amount of "green oil" is extremely small the adsorbing agent used for removing it can be used for an extended period of time. Regeneration of the adsorbing agent is usually not worth while, and hence, after its removal, it is burned.

In contrast to the solvents used in the first and second washing stages, the polar solvent used in the third washing stage contains large amounts of almost entirely $C_2$-hydrocarbons which can be removed by expansion and regeneration. Because of the sluggishness of the preceding washing step, however, it is possible for traces of higher boiling, readily polymerizable components to enter the third washing circuit. Any possible accumulation thereof should be avoided, but a separate regeneration system designed especially for the separation of these traces, as used in the preceding stages, does not need to be provided. This difficulty has been satisfactorily overcome by drawing off from the acetylene washing stage a small portion of the polar solvent in an amount corresponding to the losses incurred during the preparation of the solvent of the diacetylene washing circuit and feeding it into the regenerated solvent of the diacetylene washing circuit while the main portion of it is regenerated by expansion and heating, with the liberation first of the dissolved ethylene and ethane and then of the acetylene.

In order to remove the concurrently dissolved $C_2$-hydrocarbons ethylene and ethane without contaminating the recovered acetylene with stripping gas from outside, the ethylene and ethane in a later stage of the process are drawn off by using acetylene as stripping gas during simultaneous spraying with cold polar washing fluid whereby the acetylene is liberated from the saturated solution by warming and/or is taken from the acetylene current forming the end product. The acetylene flowing upwardly in the head of the stripping column together with the ethylene and ethane is selectively held back there, because of its greater solubility, by the cold polar washing fluid.

In order to reduce the acetylene and ethylene losses to a minimum, the $C_2$-hydrocarbon-containing stripping gases which occur in the stripping columns of the three washing circuits are returned to the crude gas.

By washing out the $C_3$-hydrocarbon with a nonpolar solvent, the gas being treated becomes saturated with solvent vapors and carries them into the acetylene washing stage where they would accumulate in the lower boiling polar solvent. This difficulty is eleminiated by a further improvement of the process of the present invention by interposing, between the absorption with nonpolar solvent and the acetylene washing stage, an intermediate washing stage in which the entrained solvent vapors are washed out by a mixture of the regenerated solvent from the diacetylene washing circuit with a minor portion of the saturated solvent from the acetylene washing stage.

The advantage of the combination of process steps which comprise the present invention is that by the successive performance of the three washing steps with a polar, a nonpolar and a polar solvent respectively, an effective separation of the acetylene is accomplished, and in particular from propylene and propane. The products are also obtained in a high degree of purity by stripping the products, and by returning the stripping gases to the crude gas the loss of acetylene and ethylene is kept at a minimum, the acetylene purity being of the order of 99.5% and the losses amounting to approximately 0.5%. The impurities consist of not in excess of 0.1% of $C_3$- and not in excess of 0.4% of $C_4$-hydrocarbons. The acetylene content of the washed gases can, if desired, be reduced to less than 5 p.p.m. The process also prevents any possible occurrence of explosive concentrations of acetylene or higher acetylenes in the liquid phase. Finally, there is also the assurance that not only in the first washing circuit, but also in the second and third circuits there will be no accumulation of any harmful impurities, such results being accomplished at a minimum cost by careful control of the required operating conditions which are different in each of the three washing circuits.

The apparatus for carrying out the above described new process for the removal of the higher acetylenes and polyenes from the nonpolar solvent by hydrogenation consists of three successive washing columns, each of which has associated with it a regenerating circuit for the polar, nonpolar or polar washing fluid, and where the second washing circuit which uses nonpolar washing fluid also includes a hydrogenating system, and preferably an adsorber in series thereafter. Each solvent circuit includes at least one stripping column for preliminary degassing of the saturated solvent, and at least one column in series thereafter for further purification of the solvent. The hydrogenation system and the adsorber are preferably in a circuit which is connected in parallel to the conduit for nonpolar solvent leaving the sump of the regenerator column.

Of the three solvent circuits associated with the washing columns, the circuit containing the nonpolar washing fluid is in the form of a closed circuit. In the first circuit for the polar solvent are included the lower section of the third washing column, the first washing column and the regenerating system in series, while the upper section of the third washing column is connected to the second circuit for polar washing fluid. Between the upper and lower sections of the third washing column there is a collecting device for saturated washing fluid which is arranged in such a manner that the portion of the solvent lost during the preparation of the solvent of the first washing circuit is delivered to the lower section of the third washing circuit.

An installation for producing pure acetylene from the solution obtained from the third washing stage consists of a combination of regenerators one of which consists of a stripping column connected to a conduit which delivers saturated washing fluid from the third washing column, the lower section of the stripping column comprising at least one heat exchanger warmed by regenerated solvent and, if desired, connected to a conduit for supplying pure acetylene as a stripping gas, the head of the stripping column being connected to a conduit for supplying cooled regenerated solvent and with at least one cooler for absorbing the heat of solution. Another of these regenerators consists of a column having a heater in the sump for heating the solvent therein to the boiling point and having in its head a water cooler connected to a delivery conduit for receiving completely regenerated solvent from the heat exchanger in the sump of the stripping chamber and with a conduit for receiving partially saturated solvent from the sump of the stripping column with, if desired, a heat exchanger in series with a separator in the last mentioned conduit.

The removal of high-boiling impurities and water is especially simple and effective if the discharge conduit for saturated solvent from the first washing column is connected with the cold end of the precooler, and preferably in parallel therewith.

The accompanying drawing is a schematic of the process illustrating the present invention. The invention will now be described with reference to a specific example, together with a detailed description of the installation used therefor. It is understood, however, that various modifications of both the specific procedure and the particular installation used therein will be obvious to one skilled in the art. Such variations, however, which do not depart from the basic concept of the process and installation disclosed herein are intended to come within the scope of the appended claims.

In the specific process described below the gas treated was obtained by oxygen pyrolysis of light gasoline and had the following composition:

Table

|  | Mole percent |
|---|---|
| $CO_2$ | 7.1 |
| $H_2$ | 33.4 |
| $CO$ | 28.0 |
| $Ar+N_2$ | 0.2 |
| $O_2$ | 0.4 |
| $CH_4$ | 8.2 |
| $C_2H_2$ | 9.8 |
| $C_2H_4$ | 9.6 |
| $C_2H_6$ | 0.4 |
| $C_3H_4$ | 0.4 |
| $C_3H_6$ and $C_3H_8$ | 1.1 |
| $C_4H_2$ (diacetylene) | 0.1 |
| $C_4H_4$ (vinylacetylene) | 0.2 |
| $C_4$—remainder | 0.1 |
| $C_5$ and higher | 1.0 |
|  | 100.0 |

EXAMPLE 19,000 Nm.³/h. of the above gas were first freed from carbon dioxide by washing with ammonia water and then introduced by conduit 1 under a pressure of 15 atm. at room temperature into the first low-temperature washing circuit, the diacetylene washing stage which can be considered as including the coolers 2 and 3 in which the crude gas was cooled to −40 C. in countercurrent relation through conduits 4a to 4d to the fractionation products and by the vaporization of ammonia. Both of these coolers were sprayed by the methanol coming from the serially connected diacetylene washing column 5, the methanol taking up the components such as water, $C_4$— and higher hydrocarbons and aromatics which condensed at the temperatures of the cooler. In the diacetylene washing column 5 the crude gas with the methanol which had been cooled in the ammonia cooler 6 after having been saturated in the washing column 10 with octane vapors, ethylene and acetylene, was freed from the diacetylene and from the other $C_4$— and higher hydrocarbons. The amount of solvent, approximately 1 t./h. was measured in such a manner that the diacetylene went completely into solution. At the same time the monovinylacetylene, methylacetylene and propadiene were also removed thereby.

After this preliminary purification, the gas was then delivered to the washing column 7 of the $C_3$— washing circuit where nonpolar solvent, previously cooled in the $NH_3$-cooler, namely an octane fraction having a boiling range of 110–140° C., absorbed the entrained $C_3$—hydrocarbons methylacetylene, propadiene, propane and the much more abundant propylene, as well as the remaining monovinylacetylene and any cyclopropane present. For this purpose about 17 t./h. of circulating washing fluid was necessary. The heat of solution was removed by the ammonia cooler 9.

The washing gas, now containing hydrogen, carbon monoxide and methane and principally only $C_2$-hydrocarbons was next passed to the washing column 10 of the acetylene washing circuit. In the lower section of this column the octane vapors carried over from column 7 were washed out by the washing fluid of the diacetylene washing circuit which was regenerated in the methanol producing plant 11, compressed by pump 50 to about the 14.5 atm. pressure prevailing in the column 10 and cooled in the cooler 12. In column 10 this washing fluid had added to it about 10 kg./h. methanol sprayed into the upper portion of the column 10 from the acetylene washing circuit. This corresponded to the losses sustained by the methanol producing process and by the solvent content of the gases from the washing and stripping stages. The octane-containing solvent from the sump of column 10 was then delivered by pump 51 to the diacetylene column 5.

In the upper section of column 10 the acetylene was washed out. As a solvent, use was made of regenerated methanol reduced to the temperature of the vaporizing ammonia in the cooler 15. The amount of solvent passing through the conduit 49a exceeded that of the diacetylene washing circuit because of the much lower solubility of the acetylene as compared with that of the diacetylene, about 28 t./h. in the present instance. The heat of the solution was liberated to the vaporizing ammonia at 13. The gaseous mixture which now contained only additional ethylene, ethane and lower boiling components and approximately 5 p.p.m. of acetylene then left column 10 through conduit 14 for delivery to the lower temperature fractionator 32.

The methanol which was delivered to the head of the column 10, except for the amount fed into the diacetylene washing circuit, was then drawn off at 16, expanded to 1.3 to 1.4 atm. pressure in the cooler 17 in counter-current relation to the regenerated methanol by which it was warmed, and then introduced into the middle portion of the ethylene vaporizing column 18 in which the other gaseous components, principally ethylene, which went into solution in column 10, were driven out of solution. The methanol, which was sprayed downwardly in column 18, was heated by fresh warm methanol in warming stages 19 and 20. The temperature in the sump of the column was about 0° C. The vaporizing acetylene carried along with it the ethylene in the upper portion of column 18. This operation was augmented by the introduction of pure acetylene from conduit 33. The ascending acetylene was washed back down the column by 26 t./h. of cold pure methanol from conduit 49b. The heat of solution was taken up by the vaporizing ammonia in the cooling stage 21. The vaporized ethylene was removed by conduit 4d, and to avoid ethylene and acetylene losses after being warmed in the precooler 2, and returned to the crude gas. In contrast to the acetylene washout in column 10, extremely small amounts of acetylene can be ignored at this point.

The methanol leaving the sump of column 18, and now saturated almost exclusively with acetylene, was next delivered by pump 52 through heat exchanger 22 to the separator 23 and then by means of pump 53 through the heat exchanger 24 to the regenerator column 25. Much of the dissolved acetylene was vaporized by being warmed in heat exchanger 22 and was removed partly by the separator 23 and partly in the head of regenerator column 25. The remainder of the acetylene was then driven out in regenerator column 25 by ascending methanol vapors produced by the vaporizer 26. The acetylene-free methanol was received by the pump 54 for passage through the heat exchangers 24, 22, 20, 19 and 17, through the final ammonia cooler 15 and then into the washing column 10 or back into the ethylene vaporizing column 18. The ascending acetylene in the regenerator column 25 still contained large amounts of methanol which were removed mainly by the cold water condenser 28. The blower 29 forced the acetylene through the cooling stages formed by exchangers 30 and 31 which greatly reduced the methane content of the acetylene. The pure acetylene was drawn off by conduit 60 and contained more than 99.5% acetylene, less than 0.4% ethylene and less than 0.1% $C_3$-hydrocarbons, especially propylene. The yield of acetylene was in excess of 98%.

The amounts of higher boiling polymerizable hydrocarbons were so small that the washing fluid could be completely regenerated in the usual manner by expansion and warming. A gradual accumulation of these undesired components was avoided, as previously described, by continually diverting a small portion of the saturated washing fluid from the acetylene washing circuit into the solvent circuit of the diacetylene washing stage. In the diacetylene washing circuit and in the $C_3$-washing circuit, however, it was necessary after the usual regeneration to carry out a careful separation of the higher acetylenes and propylenes. This was done specifically as follows:

The mixture of methanol, water, aromatics and higher hydrocarbons leaving the coolers 2 and 3 was expanded in the stripping column 27 kept under a pressure of 1.3 atm. and was stripped by an amount of auxiliary gas sufficient to drive out all lighter components dissolved therein, including the $C_2$-hydrocarbons. An ammonia cooler at the head of the column 27 held back the entrained methanol vapors. The gas passed through conduits 35 and 37 to the conduit 4d for return with the ethylene-containing gas liberated from the ethylene vaporizing column 18 and with other ethylene-containing fractions of the fractionator 32 to the crude gas. As an auxiliary gas for this purpose, use was made of a portion of the methanol synthesis gases ($2H_2+CO$) obtained in the fractionator 32 and drawn off by the conduit 4b. The solution containing the diacetylene and the remaining higher acetylenes and polyenes was delivered by pump 55 to the methanol preparation plant 11 where it was again treated with a much larger amount of auxiliary gas in a second stripping column in the presence of water at a temperature below the boiling point of methanol. From the remaining water-methanol mixture the methanol was distilled off and delivered by pump 50 through exchanger 12 into the lower portion of column 10.

The octane fraction which became saturated with $C_3$-hydrocarbons in column 7 was expanded in the stripping column 38 and, like the methanol of the diacetylene washing circuit, was stripped with such an auxiliary gas mixture ($2H_2+CO$) that only the dissolved lighter components including the $C_2$-hydrocarbons were driven off. The evolved gas passed through conduit 36 to mix with the gas in conduit 35 from stripping column 27. The liquid from stripping column 38 was delivered by pump 56 partly through conduit 34a and through a heat exchanger 39 to the middle section of regenerator column 40 and partly through the conduit 34b into the head of column 40 as reflux liquid. By combined warming and stripping with auxiliary gas, in this case, an impure methane fraction delivered by conduit 4c from the fractionator 32, the $C_3$-hydrocarbons were liberated from the octane at $+60°$ C. and delivered by conduit 41 to the fuel gas reservoir. The octane thus purified was delivered by pump 57 under the pressure of the washing column 7, namely 15 atm., first through the heat exchangers 42 and 39 and then through ammonia cooler 8 where it has cooled to $-40°$ C. for delivery to the head of the $C_3$-washing column 7.

To avoid an accumulation of higher acetylenes and polyenes in the circulating octane to a concentration higher than about 0.3 kg./t. octane, about 3% of the circulating octane was drawn off through conduit 43, expanded to the pressure at which the ammonia synthesis gas from the fractionator 32 was available, namely about 13 atm., and then together with an amount of gas taken from the ammonia synthesis conduit 4a, the hydrogen portion of which was 110 to 120% of the stoichiometric amount, was passed over a hydrogenation contact mass 44 at $5°$ C. at the rate of 10 to 30 l. solution per l. of contact mass. Here the polymerizable compound were converted into higher boiling compounds no longer polymerizable. The hydrogen-containing gas leaving the hydrogenation contact mass through conduit 45 was then conducted away by conduit 41. The hydrogenated solution was then finally freed in an adsorber 46, filled with activated carbon, from the hydrocarbons having boiling points higher than octane, the so-called "green oil," which were formed during the hydrogenation. The solution was then again brought to the pressure of the washing column 7 by pump 47 and delivered by conduit 48 to the main current of washing fluid. The adsorber containing about 70 kg. of adsorbing agent (activated carbon) remained active for about half a year and was then burned.

What is claimed is:

1. A process for the recovery of substantially pure acetylene from gaseous acetylene-containing mixtures produced by the cracking of hydrocarbons and containing diacetylene and $C_3$-hydrocarbons, which comprises the steps of: (1) scrubbing said gaseous mixture with a sufficient amount of polar solvent to dissolve the diacetylene contained therein, but an insufficient amount to dissolve a substantial quantity of acetylene; (2) scrubbing the resulting gaseous mixture from step (1) with a nonpolar solvent to dissolve the $C_3$-hydrocarbons therein; (3) scrubbing the resultant gaseous mixture from step (2) with a polar solvent to dissolve acetylene therein; and (4) recovering the acetylene from the resultant polar solvent solution of acetylene.

2. The process of claim 1, wherein at least step (1) is carried out at temperatures ranging from $-20°$ C. to $-80°$ C., and at pressures ranging from 13 to 15 atmospheres, the maximum pressure being determined by the Reppe safety curves.

3. The process of claim 1, wherein the removal of the diacetylene is effected under a pressure not lower than that of the gas generation and not in excess of that of the next following absorption stage, and the absorption of the $C_3$-hydrocarbons is effected with a nonpolar solvent and that of the acetylene with a polar solvent, at higher pressures not substantially exceeding 15 atmospheres.

4. The process of claim 1, wherein methanol is used as the polar solvent and a gasoline fraction having a boiling point between $70°$ and $150°$ C. is used as the nonpolar solvent.

5. The process of claim 1, comprising the further steps of expanding loaded solvent flowing from the diacetylene scrubbing stage, and treating same in a first stripping zone with sufficient stripping gas for recovery of dissolved acetylene, and in a second stripping zone in the presence of water with a greatly increased amount of stripping gas, at a temperature below the boiling point of the polar solvent.

6. The process of claim 1, wherein the higher acetylenes and polyenes absorbed in the nonpolar solvent are catalytically hydrogenated while in solution.

7. A process of claim 1, comprising the further steps of expanding loaded, nonpolar solvent from the $C_3$-scrubbing stage, treating same in a first stripping zone with sufficient auxiliary gas for the recovery of dissolved acetylene and ethylene, and in a second stripping zone by an auxiliary gas at a temperature and pressure below which polymerization of the dissolved polyenes begins, and then subjecting at least a portion of the resulting stream of nonpolar solvent to catalytic hydrogenation.

8. The process of claim 6, wherein the higher acetylenes and polyenes absorbed in the nonpolar solvent are catalytically hydrogenated at temperatures between $0°$ and $30°$ C.

9. The process of claim 6, further comprising the step of treating the resulting hydrogenated solution with an adsorbing agent to free the solution from the higher boiling components produced by the hydrogenation operation.

10. The process of claim 1, wherein ethylene and ethane are driven off in the acetylene scrubbing stage by the use of acetylene as stripping gas during simultaneous spraying with cold polar solvent.

11. The process of claim 1, wherein between the absorption with the nonpolar solvent and the acetylene scrubbing stage, an absorption stage is interposed in which the entrained solvent vapors are washed out by a mixture of regenerated solvent from the diacetylene scrubbing circuit and a small portion of the saturated solvent from the acetylene scrubbing stage.

12. The process of claim 9, wherein $C_2$-hydrocarbon-containing gases from the stripping columns are returned to the crude gas.

13. The installation of claim 17, further comprising discharge conduit means for the saturated solvent from the first washing column is connected in parallel with the cold ends of means for precooling said gaseous acetylene-containing mixture upstream of said washing columns.

14. The process of claim 1, further comprising precooling the acetylene-containing gas in a step preceding step (1), and during its precooling, said gas is sprayed with loaded polar solvent from the diacetylene scrubbing step (1).

15. The process of claim 2, further comprising precooling the acetylene-containing gas in a step preceding step (1), and during its precooling, said gas is sprayed with loaded polar solvent from the diacetylene scrubbing step (1).

16. The process of claim 1, comprising the further steps of withdrawing a minor portion of the acetylene-loaded polar solvent from the acetylene scrubbing stage (3); regenerating polar solvent from loaded solvent of step (1); and combining said minor portion with regenerated solvent; and expanding and heating a major portion of the acetylene-loaded solvent to liberate first the dissolved ethylene and ethane and then the acetylene, thereby regenerating additional polar solvent.

17. An installation for the recovery of substantially pure acetylene from gaseous acetylene-containing mixtures produced by the cracking of hydrocarbons comprising three serially connected washing columns, the first and third washing columns having associated with them regenerator circuits for polar solvents, and the second washing columns having associated with it a regenerator for nonpolar solvent, the first circuit for polar solvent having in it in series the lower section of the third washing column, the first washing column and the regenerating devices, and the upper section of the third washing column being connected with a further circuit for polar solvent, there being a collecting device for saturated washing fluid between the upper and lower sections of the third washing column, the collecting device being so dimensioned that the amount of solvent which enters the lower section of the third washing column corresponds to the losses that occurred during the preparation of the solvent of the first washing circuit.

18. An installation for the recovery of substantially pure acetylene from gaseous acetylene-containing mixtures produced by the cracking of hydrocarbons comprising three serially connecting washing columns, the first and third washing columns having associated with them regenerator circuits for polar solvents, and the second washing column having associated with it a regenerator for nonpolar solvent, the regeneration system used in the third washing circuit comprising:

(a) a stripping column connected to a conduit that takes saturated washing liquid from the washing column to a conduit for delivering pure acetylene to it as a stripping gas, the lower section of the stripping column containing at least one exchanger warmed by regenerated solvent while the head of the stripping column is connected to a delivery conduit for cooled regenerated solvent and with at least one cooler for taking up the heat of solution;

(b) a regenerating column with a heater in the sump for heating the solvent to the boiling point and a cold water cooler in the head of the column, and a conduit for taking fully regenerated solvent from the heat exchanger in the sump of the stripping column and partially saturated solvent from the sump of the stripping column; and (c) a heat exchanger in the conduit for partially saturated solvent and a separator in series therewith.

References Cited
UNITED STATES PATENTS

| | | | |
|---|---|---|---|
| 1,938,991 | 12/1933 | Wulff | 260—679 |
| 3,075,917 | 1/1963 | Kroning et al. | 260—677 |

DELBERT E. GANTZ, *Primary Examiner.*

J. D. MYERS, *Assistant Examiner.*